(12) United States Patent
Kim

(10) Patent No.: US 8,173,293 B2
(45) Date of Patent: May 8, 2012

(54) POUCH TYPE BATTERY PACK

(75) Inventor: Joongheon Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 798 days.

(21) Appl. No.: 12/099,199

(22) Filed: Apr. 8, 2008

(65) Prior Publication Data

US 2009/0023057 A1    Jan. 22, 2009

(30) Foreign Application Priority Data

Jul. 19, 2007   (KR) ........................ 10-2007-0072185

(51) Int. Cl.
*H01M 6/42* (2006.01)
*H01M 6/12* (2006.01)
*H01M 10/50* (2006.01)

(52) U.S. Cl. ......... 429/151; 429/162; 429/157; 429/120

(58) Field of Classification Search .................. 429/162, 429/151, 149, 157, 120, 71
See application file for complete search history.

(56) References Cited

U.S. PATENT DOCUMENTS

| | | | |
|---|---|---|---|
| 5,547,780 A * | 8/1996 | Kagawa et al. | 429/149 |
| 6,818,343 B1 * | 11/2004 | Kimoto et al. | 429/99 |
| 2004/0119442 A1 * | 6/2004 | Lee et al. | 320/112 |
| 2006/0083980 A1 | 4/2006 | Choo et al. | |
| 2006/0214641 A1 | 9/2006 | Cho | |

FOREIGN PATENT DOCUMENTS

| | | |
|---|---|---|
| CN | 1508892 A | 6/2004 |
| CN | 1768443 | 5/2006 |
| EP | 1 630 896 | 3/2006 |
| EP | 1 760 803 | 3/2007 |
| JP | 2003-59464 | 2/2003 |
| JP | 2003-234094 | 8/2003 |
| JP | 2004-311402 | 11/2004 |
| JP | 2004-355917 | 12/2004 |
| JP | 2005-123007 | 5/2005 |
| KR | 2005-725 | 1/2005 |

OTHER PUBLICATIONS

Office Action dated Jun. 27, 2011 for corresponding Chinese Application No. 200810085928.9 (with translation).

* cited by examiner

*Primary Examiner* — Patrick Ryan
*Assistant Examiner* — Julian Anthony
(74) *Attorney, Agent, or Firm* — Knobbe, Martens, Olson & Bear, LLP

(57) ABSTRACT

A pouch type battery pack, including: a first pouch battery and a second pouch battery adjacent to the first pouch battery, wherein the first and second pouch batteries are combined by bonding an edge of the first pouch battery and an edge of the second pouch battery to each other. Accordingly, the bare cell can be separated without being damaged when the pouch battery is separated from the battery pack. Furthermore, the heat radiation performance is improved by including a heat radiation member between the two pouch batteries when the pouch batteries are stacked.

20 Claims, 6 Drawing Sheets

POUCH TYPE BATTERY PACK

CROSS-REFERENCE TO RELATED APPLICATION

This application is claims the benefit of Korean Application No. 2007-72185, filed Jul. 19, 2007 in the Korean Intellectual Property Office, the disclosure of which is incorporated herein by reference.

BACKGROUND OF THE INVENTION

1. Field of the Invention

Aspects of the present invention relate to a pouch type battery pack, and more particularly, to a pouch type battery pack suitable for forming a battery pack of a pouch battery.

2. Description of the Related Art

Generally, a rechargeable battery is classified as a cylindrical, angular or pouch type battery according to an appearance of a case receiving an electrode assembly. Specifically, the pouch type battery includes an electrode assembly and a pouch case surrounding and sealing the electrode assembly. The electrode assembly is formed by interposing a separator between cathode and anode plates, and stacking or winding the separator and the plates altogether. Electrode tabs are respectively welded to the cathode and anode plates. The electrode tabs are assembled to project outside the pouch case when the electrode assembly is received in the pouch case.

The pouch case includes a case body and a case cover. The case body has a space that receives the electrode assembly and the case cover is extended from one end of the case body and covers the case body. The case body and the case cover are combined with each other by sealing the case cover to a flange formed at a side part of the case body.

Generally, when a battery pack is formed by a single pouch type rechargeable battery, one protection circuit is connected to one pouch battery. On the other hand, in the case of a notebook computer and the like that require a high capacity battery in addition to the single pouch type battery, one protection circuit is included per two or more batteries. When two or more batteries are included per one protection circuit, the pouch batteries are stacked in a vertical direction and fixed by being bonded by a double coated tape interposed therebetween.

However, the conventional pouch type battery pack, in which the plurality of batteries are stacked and bonded face-to-face with each other, has various problems. For example, when defects of the battery pack not caused from the battery itself are checked, the battery is separated from the pack. In this time, there is a problem that the pouch is damaged by the double coated tape and thus the battery cannot be reused. Particularly, when the battery of the battery pack has a high capacity, the loss in cost becomes large.

In addition, the batteries of the conventional battery pack are stacked while being attached face to face with each other. Thus, high temperature heat generated from one battery is transferred to adjacent batteries without shielding, thereby increasing the temperature of the battery. Similarly, there is a problem that it is difficult to perform heat radiation because there is no gap between the batteries.

SUMMARY OF THE INVENTION

Aspects of the present invention provide a pouch type battery pack that prevents a bare cell from being damaged when a battery is separated from the battery pack in which a plurality of pouch batteries are bonded.

Aspects of the present invention also provide a pouch type battery pack that improves a heat radiation performance under a condition that a plurality of pouch batteries are laminated or stacked.

According to an aspect of the present invention, there is provided a pouch type battery pack, including: a first pouch battery; and a second pouch battery adjacent to the first pouch battery, wherein the first and the second pouch batteries are combined by bonding their edges to each other.

The edges of the two pouch batteries may be bonded to each other by adhesion.

The pouch battery may further include: a lower case that includes a rectangular bottom surface and an internal space formed by side surfaces formed along four edges of the bottom surface, such that at least three of the side surfaces include flanges projecting outwardly away and in parallel with the bottom surface; and an upper case formed in a shape of rectangular sheet, an edge of the upper case being sealed to the flange of the lower case, wherein combining surfaces may be formed at sealing portions of the lower and upper cases on each of the pouch batteries so as to adhere while contacting each other.

Each combining surface may be formed by an externally exposed surface of the flange of the lower case where a periphery of the upper case is not sealed.

The edges of the two pouch batteries may be bonded to each other by an adhesion member.

Ends of the edges of the two pouch batteries may contact each other at a contact portion, and the adhesion member may be attached to the contact portion so as to bond the two pouch batteries.

The adhesion member may be interposed between the edges of the two pouch batteries so as to bond the two pouch batteries.

The two pouch batteries may be stacked while contacting each other face-to-face.

A heat radiation member may be provided between the stacked pouch batteries.

The heat radiation member may be formed in a shape of a plate and have an area equal to or less than that of a contact surface with the pouch battery.

A plurality of radiation holes may be formed so as to pass through the heat radiation member.

The heat radiation member may include a plurality of radiation grooves formed on a surface that contacts the pouch battery.

The heat radiation member may include a hollow formed therein so as to have a rectangular parallelepiped shape whose upper and lower ends are open.

A plurality of barrier plates may be provided in the hollow of the heat radiation member.

The pouch type battery pack may further include a wrapping sheet that includes a side edge that is bonded to a bonding portion of the two pouch batteries.

The wrapping sheet may be formed so as to have a length that surrounds the two stacked pouch batteries.

According to another aspect of the present invention, there is provided a pouch type battery pack, including: an upper case having a sheet shape; a first electrode assembly provided on a surface of the upper case; and a second electrode assembly provided on the surface of the upper case and adjacent to the first electrode assembly.

The pouch type battery pack may further include: a lower case that has an internal space formed in a rectangular parallelepiped shape for each of the electrode assemblies, at least three side surfaces of four side surfaces of the internal space including flanges extended outwardly from their upper ends, wherein the upper case is sealed with the flanges of the lower case so as to close up the internal space.

An upper end of the remaining one side surface of the internal space of the lower case may be formed integrally with the upper case.

A border portion of the upper case between the electrode assemblies may be folded so as to form two stacked electrode assemblies.

According to yet another aspect of the present invention, there is provided a pouch type battery pack, including: a first pouch battery; a second pouch battery stacked above the first pouch battery; and a heat radiation member to radiate heat produced by the first pouch battery and/or the second pouch battery, the heat radiation member provided between the stacked pouch batteries.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
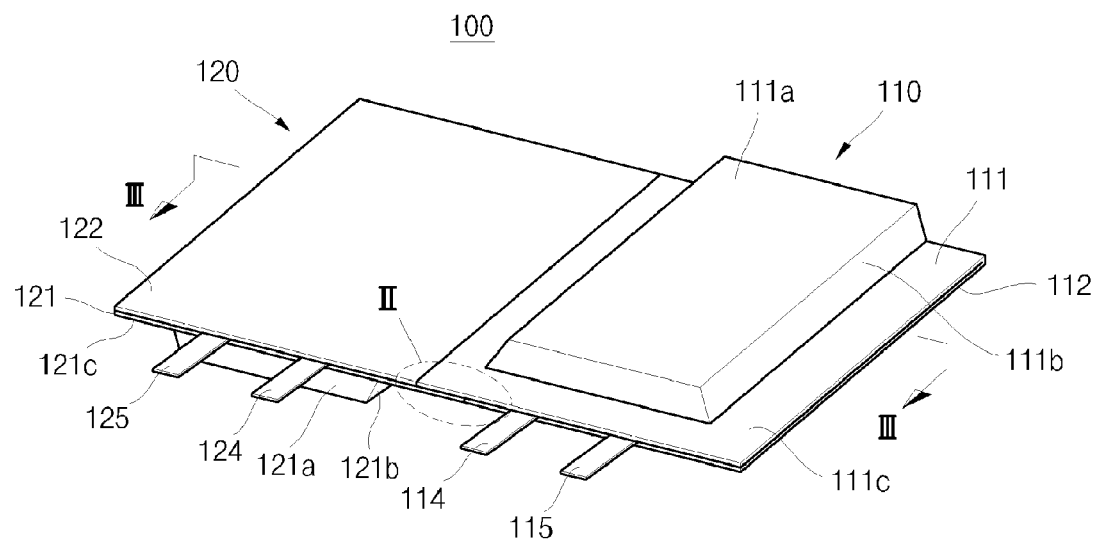
FIG. 1 is a perspective view illustrating a pouch type battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
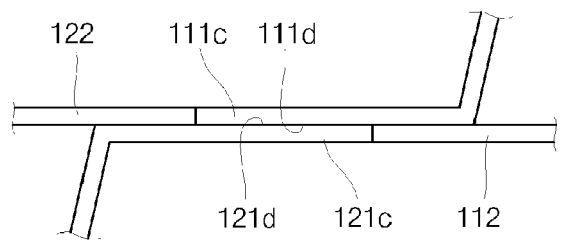
FIG. 2 is a magnification view of portion II of FIG. 1.
Figure 3:
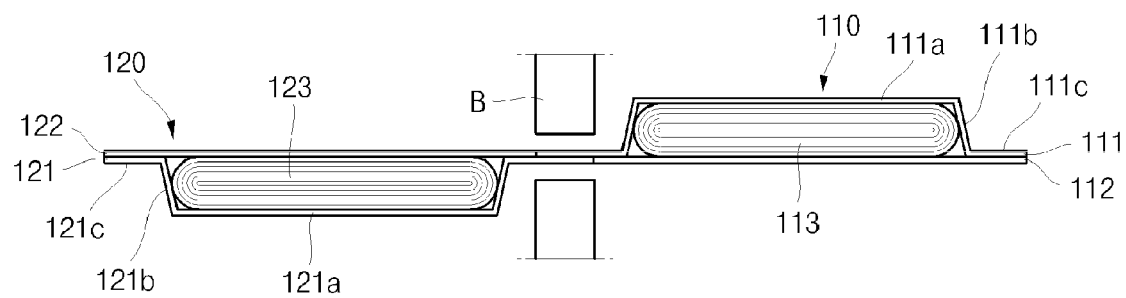
FIG. 3 is a sectional view taken along the III-III line of FIG. 1.

FIG. 1 is a perspective view illustrating a pouch type battery pack 100 according to an embodiment of the present invention, FIG. 2 is a magnification view of portion II of FIG. 1, and FIG. 3 is a sectional view taken along the III-III line of FIG. 1.

Referring to FIGS. 1 to 3, in the pouch type battery pack 100, one edge of a first adjacent pouch battery 110 of at least two pouch batteries is bonded to one edge of a second pouch battery 120 by adhesion. While with reference to FIGS. 1 to 3, a construction of the pouch type battery pack 100 includes two pouch batteries 110 and 120, it is understood that aspects of the present invention are not limited thereto. That is, aspects of the present invention may be applied to a pouch type battery pack 100 with any number of pouch batteries.

Each pouch battery 110 and 120 includes an electrode assembly 113 and 123 in a pouch forming a case. Each pouch includes a lower case 111 and 121 and an upper case 112 and 122 to seal the lower case 111 and 121.

The lower cases 111 and 121 have internal spaces of a roughly rectangular parallelepiped shape where the electrode assemblies 113 and 123 are received. The internal spaces are formed by rectangular bottom surfaces 111a and 121a and four side surfaces 111b and 121b vertically formed along four edges of the bottom surfaces 111a and 121a. Flanges 111c and 121c are provided outwardly at upper ends (i.e., the end closest to the upper cases 112 and 122) of at least three side surfaces 111b and 121b of the four side surfaces 111b and 121b, and extend parallel to the bottom surfaces 111a and 121a. The upper cases 112 and 122 are formed in a rectangular sheet shape. Three of the four edges of the upper cases 112 and 122 are sealed with the flanges 111c and 121c of the lower cases 111 and 121 so as to close the internal spaces of the lower cases 111 and 121.

Like this, the electrode assemblies 113 and 123 are received inside each lower case 111 and 121, and then the lower cases 111 and 121 are sealed by the upper cases 112 and 122 with a pair of electrode tabs (114, 115, 124 and 125) that project to an outside of the cases 111, 112, 121, and 122, thereby constructing a pouch battery.

As illustrated in FIGS. 1 to 3, the first pouch battery 110 and the second pouch battery 120 are reversed relative to each other. Furthermore, one edge of the first pouch battery 110 is bonded to one edge of the second pouch battery 120 by adhesion. The first and second pouch batteries 110 and 120 with bonded edges are connected to each other in parallel. The two pouch batteries 110 and 120 may also be bonded at other edges (except for an edge where an electrode tab 114, 115, 124, or 125 protrudes), or only at a left or a right long edge.

The structure that is formed by bonding edges of the first and second pouch batteries 110 and 120 will now be explained in more detail. One edge of the first pouch battery 110 is provided to be shorter than a flange 111c of the lower case 111 that a length of a periphery of the upper case 112 is sealed to. Thus, the one edge of the first pouch battery 110 that is bonded is the flange 111c of the lower case 111. The flange 111c of the lower case 111 is not sealed to the upper case 112 and, accordingly, a combining surface 111d exposed to the outside is formed at the flange 111c.

Likewise, one edge of the second pouch battery 120 facing the one edge of the first pouch battery 110 is provided to be shorter than a flange 121c of the lower case 121 that a length of a periphery of the upper case 122 is sealed to. Thus, the one edge of the second pouch battery 120 that is bonded is the flange 121c of the lower case 121. The flange 121c of the lower case 121 is not sealed to the upper case 122 and, accordingly, a combining surface 121d exposed to the outside is formed at the flange 121c.

Thus, the combining surface 111d exposed from the one edge of the first pouch battery 110 and the combining surface 121d exposed from the one edge of the second pouch battery 120 contact each other. As a result, the flange 111c of the lower case 111 of the first pouch battery 110 and the flange 121c of the lower case 121 of the second pouch battery 120 are adhered to each other. In FIG. 3, a mark "B" indicates a sealing block.

Figure 4:
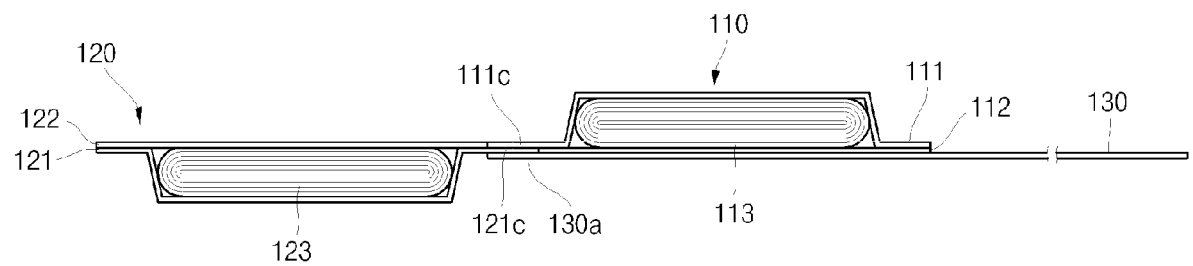
FIG. 4 is a sectional view illustrating a construction of the pouch type battery pack further including a wrapping sheet according to an embodiment of the present invention.

FIG. 4 is a sectional view illustrating a construction of the pouch battery further including a wrapping sheet according to an embodiment of the present invention. Referring to FIG. 4, a wrapping sheet 130 is further bonded to the bonding portion of the first pouch battery 110 and second pouch battery 120. One edge 130a of the wrapping sheet 130 is adhered to the combination of the flange 111c of the first pouch battery 110 and the flange 121c of the second pouch battery 120. Specifically, the one edge 130a of the wrapping sheet 130 is adhered to a lower surface of the flange 121c of the second pouch battery 120. Furthermore, the wrapping sheet 130 is provided with a length that can surround the outside of the first pouch battery 110 and second pouch battery 120.

Figure 5:
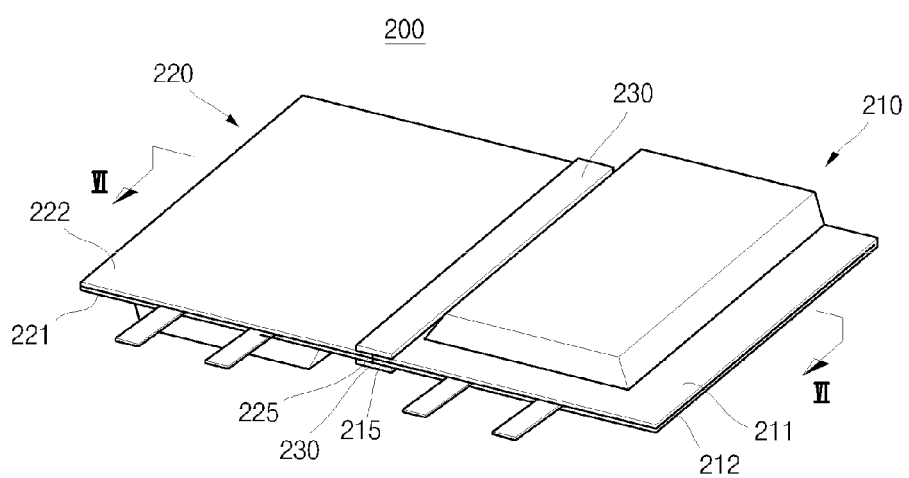
FIG. 5 is a perspective view illustrating a pouch type battery pack according to another embodiment of the present invention.
Figure 6:
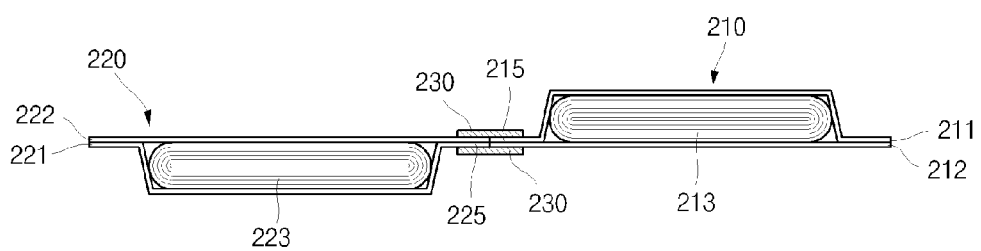
FIG. 6 is a sectional view taken along the VI-VI line of FIG. 5.

FIG. 5 is a perspective view illustrating a pouch type battery pack 200 according to another embodiment of the present invention, and FIG. 6 is a sectional view taken along the VI-VI line of FIG. 5. Referring to FIGS. 5 and 6, in the pouch type battery pack 200, one edge of a first adjacent pouch battery 210 of at least two pouch batteries is bonded to one edge of a second pouch battery 220 by an adhesive member 230.

The two pouch batteries 210 and 220 illustrated in FIGS. 5 and 6 have the same shape and structure as the above embodiment described with reference to FIGS. 1 to 3, and thus, a detailed explanation will be omitted here. In the pouch type battery pack 200 described with reference to FIGS. 5 and 6, a separate combining surface is not formed on one edge of a pouch battery 210 and 220, as opposed to the pouch type battery pack 100 described with reference to FIGS. 1 to 3 above. Edges 215 and 225 of the two pouch batteries 210 and 220 are respectively contacted to a flange of a lower case 211 and 221 and a periphery of an upper case 212 and 222 with the same length and sealed. The lower cases 211 and 221 provide a space for electrode assemblies 213 and 223 of the pouch batteries 210 and 220.

The two pouch batteries 210 and 220 are arranged so as to allow the edge 215 of the first pouch battery 210 and the edge 225 of the second pouch battery 220 to contact each other. Specifically, an upper surface of one edge 215 or 225 and a lower surface of the other edge 225 or 215 are respectively attached by the adhesive member 230 (such as a bonding tape). Thus, the edge 215 of the first pouch battery 210 and the edge 225 of the second pouch battery 220 are bonded to each other and the two pouch batteries 210 and 220 are connected in parallel.

Figure 7:
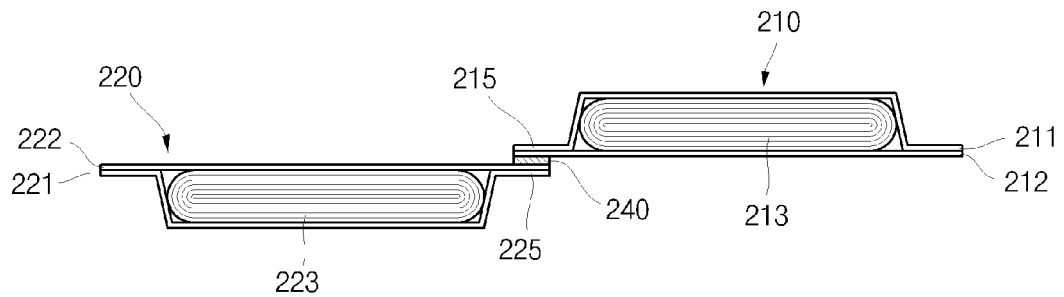
FIG. 7 is a sectional view illustrating a modification example of the pouch type battery pack according to another embodiment of the present invention.

FIG. 7 is a sectional view illustrating a modification example of the pouch type battery pack according to another embodiment of the present invention. Referring to FIG. 7, in the modification example, two pouch batteries 210 and 220 are arranged such that the edge 215 of the first pouch battery 210 and the edge 225 of the second pouch battery 220 overlap.

An adhesive member 240 (such as a double coated tape) is interposed between the edge 215 of the first pouch battery 210 and the edge 225 of the second pouch battery 220. Specifically, the two edges 215 and 225 are bonded to each other by the adhesive member 240 so as to connect the two pouch batteries 210 and 220 with each other in parallel.

Figure 8:
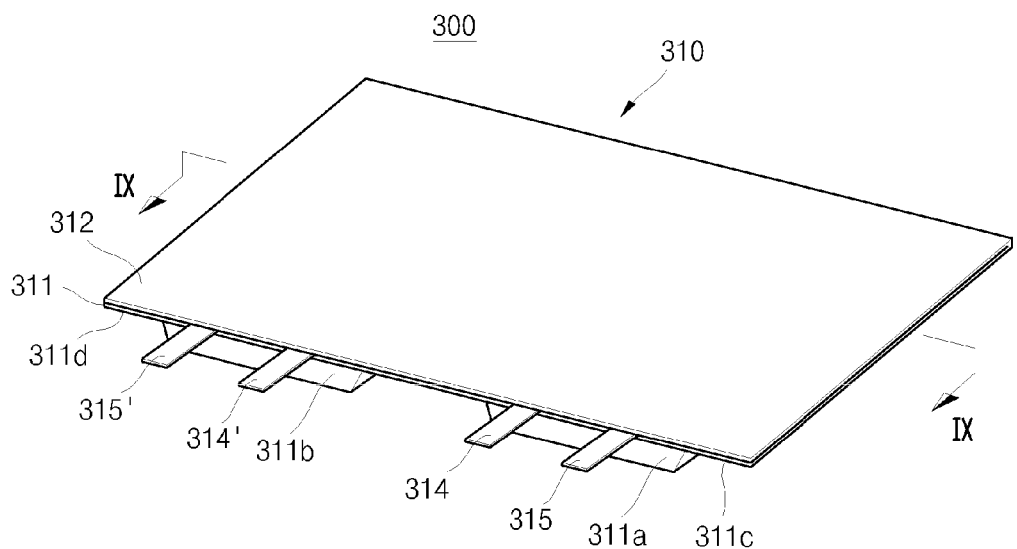
FIG. 8 is a perspective view illustrating a pouch type battery pack according to still another embodiment of the present invention.
Figure 9:
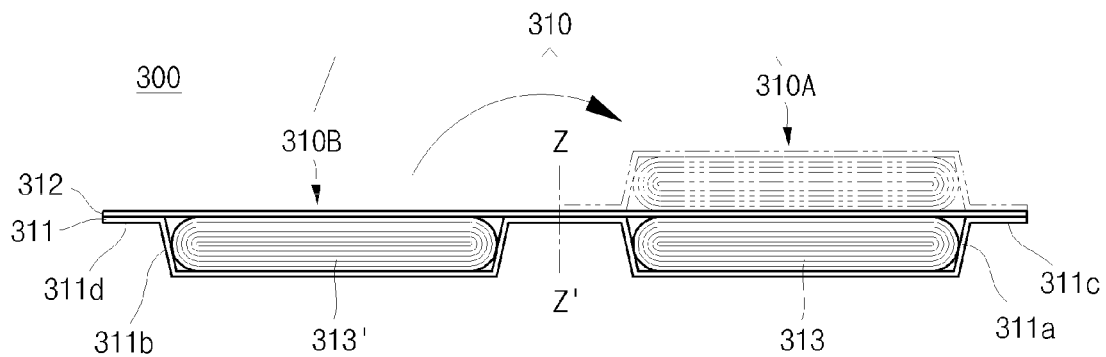
FIG. 9 is a sectional view taken along the IX-IX line of FIG. 8.

FIG. 8 is a perspective view illustrating a pouch type battery pack 300 according to still another embodiment of the present invention and FIG. 9 is a sectional view taken along the IX-IX line of FIG. 8. Referring to FIGS. 8 and 9, the pouch type battery pack 300 is constructed by forming one or more internal spaces 311a and 311b that receive at least two electrode assemblies 313 and 313' in one pouch battery 310. Thus, it has the same construction as a pouch type battery pack in which at least two pouch batteries are integrally formed.

In the pouch type battery pack 300, two internal spaces 311a and 311b are formed in a lower case 311 of the pouch battery 310. The internal spaces 311a and 311b have a volume corresponding to the size of the respective electrode assemblies 313 and 313'. Furthermore, the internal spaces 311a and 311b are formed to correspond to the shape of the respective electrode assemblies 313 and 313' (for example, in roughly rectangular parallelepiped shapes). In addition, outwardly extended flanges 311c and 311d are provided at upper ends of three side surfaces of the internal spaces 311a and 311b. An upper case 312 is formed in a sheet shape. A peripheral part of the upper case 312 is sealed to the flanges 311c and 311d of the lower case 311 so as to close up the internal spaces 311a and 311b. An upper end of the remaining one side surface (i.e., the side surface from which no flange protrudes) of the each internal space 311a and 311b is formed integrally with the upper case 312.

Each electrode assembly 313 and 313' is received in the each internal space 311a and 311b. Electrode tabs (314, 315, 314' and 315') of the electrode assemblies 313 and 313' are respectively projected to an outside of the lower case 311.

Referring to FIG. 9, a virtual line Z-Z' indicates a state that first and second pouch battery regions 310A and 310B are formed in a pouch battery. A structure of a pouch type battery pack 300 including two stacked pouch batteries is formed by folding the second pouch battery region 310B in a direction of an arrow mark to the first pouch battery region 310A about the virtual line Z-Z'.

Figure 10:
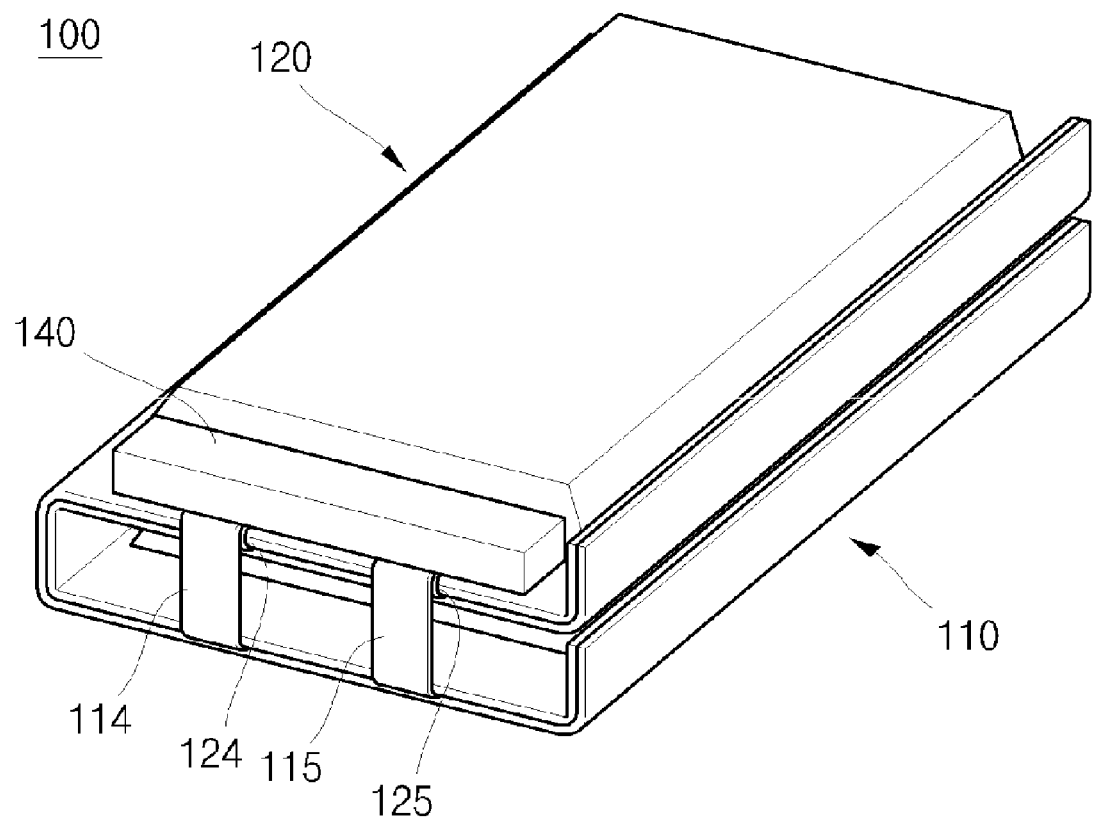
FIG. 10 is a perspective view illustrating a state that two pouch batteries are stacked according to an embodiment of the present invention.

FIG. 10 is a perspective view illustrating a state that two pouch batteries are stacked, their edges being bonded to each other by adhesion, according to an embodiment of the present invention. The two pouch batteries 110 and 120 are stacked in a vertical direction by folding a second pouch battery region 120 above a first pouch battery region 110. Furthermore, edges of the first and second pouch batteries 110 and 120 are bonded to each other by adhesion so as to be connected with each other in parallel. In addition, a core pack is constructed by connecting electrode tabs 114 and 115 of the first pouch battery 110 and electrode tabs 124 and 125 of the second pouch battery 120 with a protection circuit 140. Accordingly, assembling of the battery pack 100 is completed by assembling other accessories in a state where the two pouch batteries 110 and 120 are not separated from each other.

Figure 11:
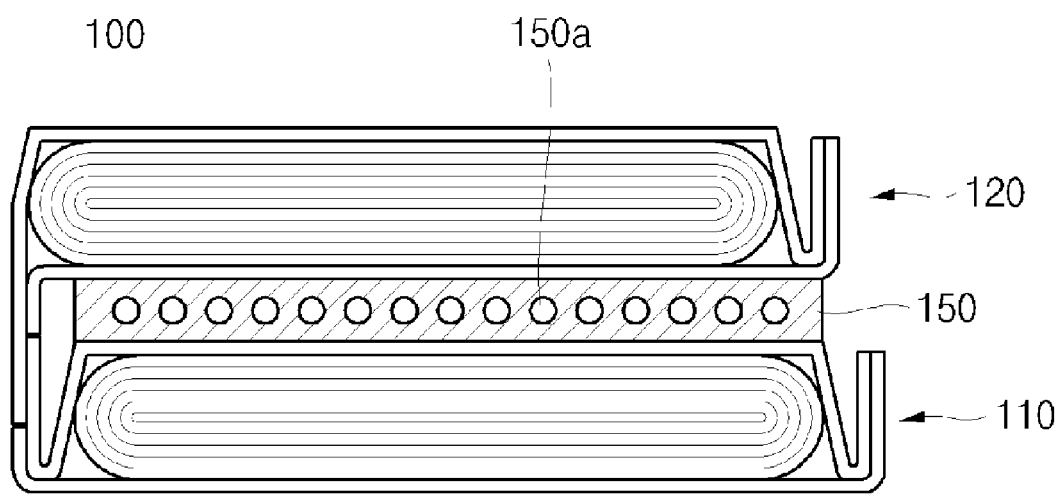
FIG. 11 is a sectional view illustrating a heat radiation structure of the pouch type battery pack according to an embodiment of the present invention.

A heat radiation structure applied to the pouch type battery pack will now be explained. FIG. 11 is a sectional view illustrating a heat radiation structure for improving a heat radiation performance of two pouch batteries 110 and 120 stacked according to an embodiment of the present invention. Referring to FIG. 11, a pouch type battery pack 100 includes a first pouch battery 110, a second pouch battery 120 stacked on the first pouch battery 110, and a heat radiation member 150 interposed between the two pouch batteries 110 and 120.

The heat radiation member 150 may have a plate shape. Furthermore, the heat radiation member 150 may have an area equal to or less than that of a contact surface between the two pouch batteries 110 and 120. When the size of the heat radiation member 150 is too large, the heat radiation member 150 may project from the stacked pouch batteries 110 and 120, thereby worsening an assembly of the pouch type battery pack 100. A plurality of heat radiation holes 150a are provided to pass through the heat radiation member 150.

When the heat radiation member 150 is provided between the first and second pouch batteries 110 and 120, the two pouch batteries are spaced apart by the thickness of the heat radiation member 150. The two pouch batteries 110 and 120 are shielded by the heat radiation member 150. Thus, heat generated from each pouch battery 110 and 120 does not affect a respective adjacent battery 120 and 110.

Low temperature air flows through a heat radiation hole 150a formed in the heat radiation member 150. The low temperature air is heat-exchanged with high temperature air generated from the first and second pouch batteries 110 and 120, thereby decreasing temperatures of the two pouch batteries 110 and 120. Thus, the heat radiation performance of the pouch battery 100 is improved.

Figure 12:
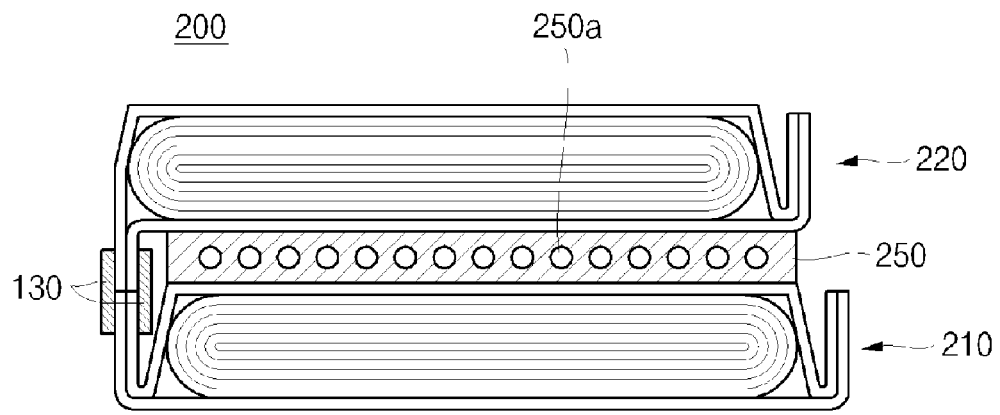
FIG. 12 is a sectional view illustrating a heat radiation structure of the pouch type battery pack according to another embodiment of the present invention.

FIG. 12 is a sectional view illustrating a heat radiation structure for improving a heat radiation performance of the two pouch batteries 210 and 220 stacked according to the another embodiment of the present invention. Referring to FIG. 12, a pouch type battery pack 200 includes a first pouch battery 210, a second pouch battery 220 stacked on the first pouch battery 210, and a heat radiation member 250 interposed between the two pouch batteries 210 and 220.

The heat radiation member 250 may have a plate shape. Furthermore, the heat radiation member 250 may have an area equal to or less than that of a contact surface between the two pouch batteries 210 and 220. A plurality of heat radiation holes 250a are provided to pass through the heat radiation member 250.

The heat radiation member 250 has substantially the same shape, structure, operation, and effect as the heat radiation member 150 described with reference to FIG. 11, and a detailed explanation will be omitted. The pouch battery pack 200 of FIG. 12 further includes a wrapping sheet 130 (as described with reference to FIG. 4). Furthermore, it is understood that the heat radiation member 150 and 250 applicable to the pouch type battery pack 100 and 200 is not limited those as described above.

Figure 13A:
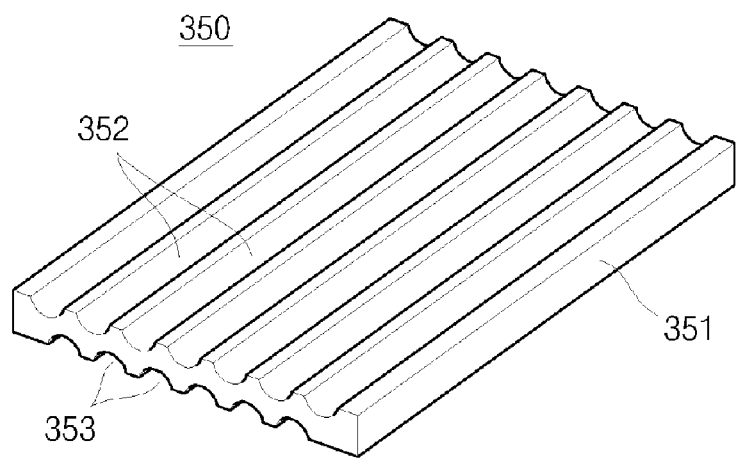
FIGS. 13A to 13C are perspective views illustrating the heat radiation structure according to various embodiments of the present invention.

Next, other various embodiments of the heat radiation member 350, 450, and 550 will be explained below with reference to FIGS. 13A to 13C. Referring to FIG. 13A, in a heat radiation member 350, semi-circular heat radiation grooves 352 and 353 are respectively formed on upper and lower surfaces of a heat radiation plate 351. The heat radiation grooves 352 and 353 may be formed on only one surface of the heat radiation plate 351, or on both the upper and lower surfaces of the heat radiation plate 351. Furthermore, the heat radiation grooves 352 and 353 may be formed in only a predetermined direction. Similarly, sectional surfaces of the heat radiation grooves 352 and 353 may be formed in triangular, rectangular or polygonal shapes.

The heat radiation grooves 352 and 353 are formed on the upper and/or lower surface where the heat radiation member 350 contacts the two pouch batteries. Thus, air passing through heat radiation grooves 352 and 353 is heat-exchanged with heat generated from the two pouch batteries, thereby decreasing the temperatures of the two pouch batteries.

Figure 13B:
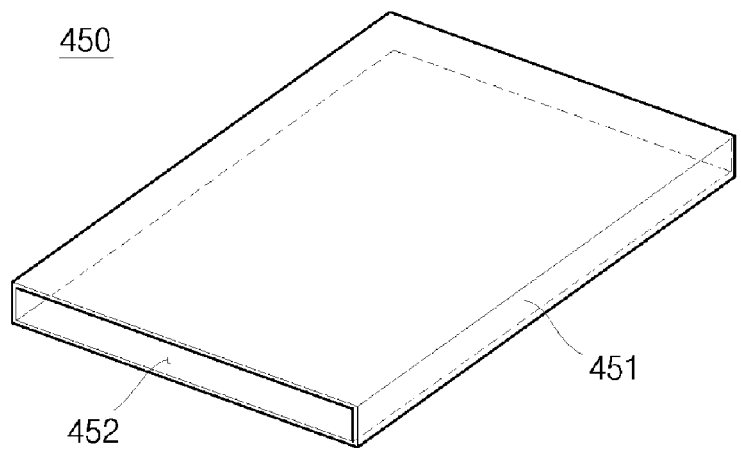

Referring to FIG. 13B, a heat radiation member 450 according to a different embodiment than that illustrated in FIG. 13A includes a hollow 452 so as to be formed as a rectangular parallelepiped heat radiation plate 451 whose upper and lower ends are opened. External air of low temperature fills through the hollow 452, thereby decreasing the temperature of the two pouch batteries that contact the upper and lower surfaces face-to-face.

Figure 13C:
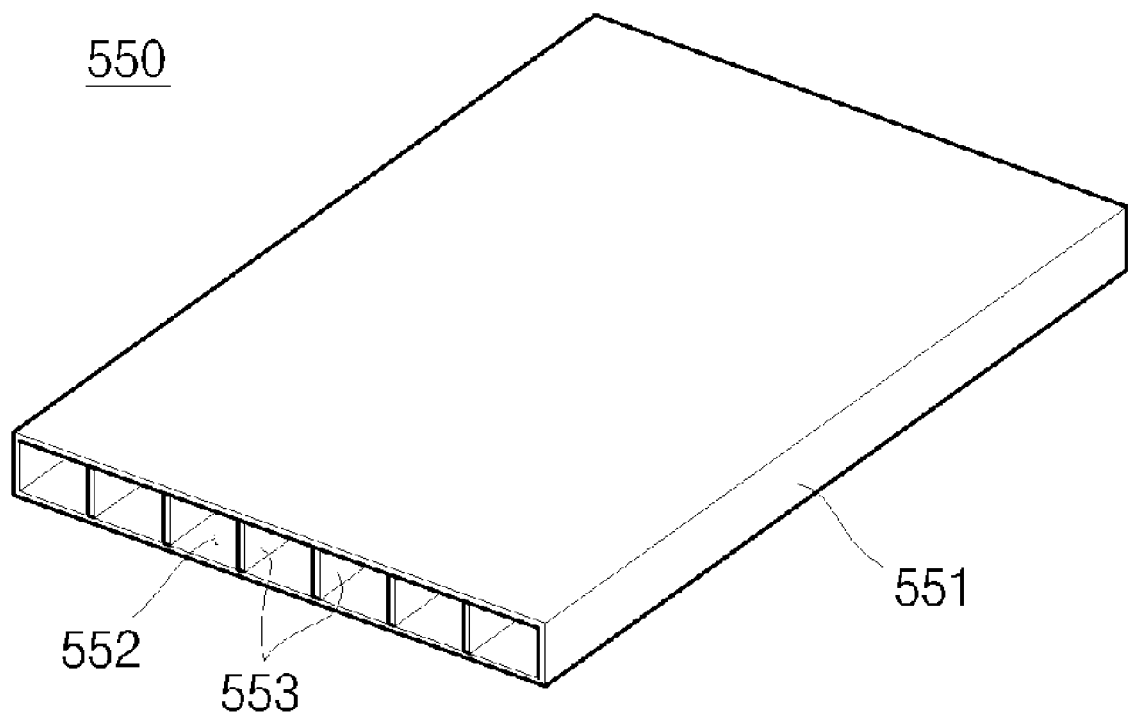

Referring to FIG. 13C, a heat radiation member 550 according to a different embodiment than those illustrated in FIGS. 13A and 13B includes a hollow 552 so as to be formed as a rectangular parallelepiped heat radiation plate 551 whose upper and lower ends are opened. A plurality of barrier plates 553 are included in the hollow 552 so as to divide an inner space of the hollow 552. The barrier plates 553 guide a flow of external air passing through the hollow 552, thereby allowing the air to be smoothly flowed. Thus, the temperature of the two pouch batteries that contact the upper and lower surfaces of the heat radiation plate 551 face-to-face is decreased.

It is understood that the heat radiation member according to aspects of the present invention is not limited to those as described above, and can be modified variously.

As described above, the pouch type battery pack according to aspects of the present invention has the following advantages. First, the bare cell the pouch type battery pack is not damaged and can be reused by separating only one bonded edge when the pouch battery is separated from the battery pack because edges of at least two adjacent pouch batteries are connected with each other by adhesion. Second, the pouch type battery pack can increase the heat radiation performance when the pouch batteries are stacked. Third, the pouch type battery pack improves reliability of the product in a large capacity battery pack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pouch type battery pack, comprising:
   a first pouch battery; and
   a second pouch battery adjacent to the first pouch battery, wherein the first and the second pouch batteries are combined by bonding an edge of the first pouch battery and an edge of the second pouch battery to each other wherein each pouch battery comprises a lower case that defines an opening that receives a battery electrode and has a bottom surface and an upper case that seals the opening that has a surface wherein flanges are formed about an outer edge where the upper case is sealed to the lower case and wherein the first pouch battery and the second pouch battery are folded about the edge of the first and second pouch batteries so that the surface of the upper case of one pouch battery is positioned adjacent the bottom surface of the lower case of the other pouch battery so that the surface of the upper case and the bottom surface of the lower case overlap.

2. The pouch type battery pack as claimed in claim 1, wherein the edge of the first pouch battery and the edge of the second pouch battery are bonded to each other by adhesion.

3. The pouch type battery pack as claimed in claim 2, wherein each pouch battery comprises:
   a lower case comprising a rectangular bottom surface, four side surfaces formed along four edges of the bottom surface, and an internal space formed by the side surfaces, such that at least three of the side surfaces include flanges that project away from the inside surface in parallel with the bottom surface; and
   an upper case formed in a shape of rectangular sheet so as to be sealed to the flanges of the lower case,
   wherein a combining surface is formed at a sealing portion of the lower case and the upper case so that the combining surface of the first pouch battery and the combining surface of the second pouch battery are adhered together when in contact with each other.

4. The pouch type battery pack as claimed in claim 1, further comprising an adhesion member to bond the edge of the first pouch battery and the edge of the second pouch battery to each other.

5. The pouch type battery pack as claimed in claim 4, wherein the adhesion member is attached to a contact portion where an end of the edge of the first pouch battery and an end of the edge of the second pouch battery contact each other.

6. The pouch type battery pack as claimed in claim 4, wherein the adhesion member is interposed between an edge of the first pouch battery and an edge of the second pouch battery.

7. The pouch type battery pack as claimed in claim 1, wherein the first pouch battery is stacked face-to-face with the second pouch battery.

8. The pouch type battery pack as claimed in claim 7, further comprising a heat radiation member to radiate heat produced by the first pouch battery and/or the second pouch battery, the heat radiation member provided between the stacked pouch batteries.

9. The pouch type battery pack as claimed in claim 8, wherein the heat radiation member has a surface area of a top surface equal to or less than a surface area of a surface of the first pouch battery in contact with the top service of the heat radiation member, and has a surface area of a bottom surface equal to or less than a surface area of a surface of the second pouch battery in contact with the bottom surface of the heat radiation member.

10. The pouch type battery pack as claimed in claim 9, wherein the heat radiation member comprises a plurality of radiation holes formed to pass through the heat radiation member from the top surface to the bottom surface.

11. The pouch type battery pack as claimed in claim 9, wherein the heat radiation member comprises a plurality of radiation grooves formed on the top surface and/or the bottom surface.

12. The pouch type battery pack as claimed in claim 9, wherein the heat radiation member comprises a hollow formed between the top surface and the bottom surface.

13. The pouch type battery pack as claimed in claim 12, wherein a plurality of barrier plates are provided in the hollow of the heat radiation member to guide a flow of external air passing through the hollow.

14. The pouch type battery pack as claimed in claim 1, further comprising a wrapping sheet having a side edge that is bonded to the edge of the first pouch battery and/or the edge of the second pouch battery.

15. The pouch type battery pack as claimed in claim 14, wherein the wrapping sheet surrounds the first and the second pouch batteries when the first and the second pouch batteries are stacked.

16. The pouch type battery pack as claimed in claim 1, wherein the first pouch battery and the second pouch battery are connected only at the edge of the first pouch battery and the edge of the second pouch battery.

17. A pouch type battery pack, comprising:
a first upper case having a sheet shape;
a second upper case having a sheet shape;
a first lower case that forms a recess and is coupled to the first upper case to define a first pouch;
a second lower case that forms a recess and is coupled to the first upper case to define a second pouch;
a first electrode assembly provided on a surface of the upper case so as to be positioned within the recess of the first lower case; and
a second electrode assembly provided on the second surface of the upper case and adjacent to the first electrode assembly so as to be positioned within the recess of the second lower case, wherein edges of the first and second pouches are coupled together and wherein the edges of the first and second pouches are folded so that the pouches are stacked on top of each other; and
a heat radiation member to radiate heat produced by the first electrode assembly and/or the second electrode assembly wherein the heat radiation member is interposed between the pouches when the pouches are folded.

18. The pouch type battery pack as claimed in claim 17, further comprising:
a lower case comprising four side surfaces and having a shape to form a first internal space in a rectangular parallelepiped shape to receive the first electrode assembly and a second internal space in the rectangular parallelepiped shape to receive the second electrode assembly,
wherein at least three of the side surfaces include flanges projecting away from the internal spaces, and the upper case is sealed with the flanges of the lower case so as to close up the first and second internal spaces.

19. The pouch type battery pack as claimed in claim 18, wherein a side surface of the lower case that does not include a flange is formed integrally with the upper case.

20. The pouch type battery pack as claimed in claim 17, wherein a portion of the upper case between the first electrode assembly and the second electrode assembly is folded so as to stack the first electrode assembly and the second electrode assembly.

* * * * *